United States Patent [19]

Lang

[11] Patent Number: 4,698,882

[45] Date of Patent: Oct. 13, 1987

[54] MOLDING ATTACHING CLIP

[75] Inventor: Steven C. Lang, Fraser, Mich.

[73] Assignee: General Motors Corporation, Detroit, Mich.

[21] Appl. No.: 19,251

[22] Filed: Feb. 26, 1987

[51] Int. Cl.$^4$ .............................................. F16B 13/00
[52] U.S. Cl. ...................................... 24/289; 24/297; 24/453
[58] Field of Search ................. 24/289, 291, 297, 292, 24/453; 411/508, 340

[56] References Cited

U.S. PATENT DOCUMENTS

| 2,948,938 | 8/1960 | Holton | 24/289 |
| 3,738,074 | 6/1973 | Tucker | 24/297 |
| 4,135,277 | 1/1979 | Taniai et al. | 24/297 |
| 4,424,612 | 1/1984 | Muller et al. | 24/289 |
| 4,517,710 | 5/1985 | Beckmann | 24/297 |

Primary Examiner—Victor N. Sakran
Attorney, Agent, or Firm—Arthur N. Krein

[57] ABSTRACT

A molding attaching clip includes a lock down/spring member having a keyhole slot therein for mounting onto the head of a head stud fixed to a support panel with a pair of spaced apart resilient pawl arms at one end thereof and a spring arm and a molding clip body member sized so as to receive the lock down/spring member therein such that the resilient pawl arms operatively engage ratchet teeth in the molding clip body member whereby this member can move against the bias force of the spring arm relative to the lock down/spring member in one direction.

4 Claims, 4 Drawing Figures

MOLDING ATTACHING CLIP

FIELD OF THE INVENTION

This invention relates to a fastener used to secure a molding to a support member and, in particular, to a molding attaching clip which includes a lock down/spring arm member and a molding clip element secured, as formed, together by at least one living hinge ribbon.

DESCRIPTION OF THE PRIOR ART

Attaching clips, made of either metal, plastic or both have been in common use, especially on automotive vehicles, to attach moldings, in the form of open channel members, to a support panel on the body of such a vehicle and, thus such attaching clips are also referred to as molding clips. In a common form of such molding clips, the body of each molding clip is provided with a key-hole slot whereby it can be secured onto a headed stud welded to the support panel, the body further having opposed recessed edge members which can engage the return bent flanges of an open channeled molding member. Also, as well known, a plurality of such headed studs and molding clips are used to attach an elongated strip of molding to the support panel of a vehicle body.

SUMMARY OF THE INVENTION

The present invention relates to an improved molding attaching clip of plastic material which includes a lock down/spring member attached by living hinge ribbons to a molding clip body member, as formed, the lock down/spring member being adapted to be rotated 180° so as to be positioned and secured in the molding clip body member, the lock down/spring member having a key-hole slot therein for its assembly to a headed stud on a support panel and a pair of spaced apart resilient retaining tooth arms which are adapted to slide over a set of plural detent or ratchet lock teeth in the molding clip body member when moved in one direction but to lockingly engage a pair of the lock teeth when movement is attempted in the opposite direction.

It is therefore a primary object of this invention to provide an improved molding attaching clip which includes a lock down/spring member secured in a molding clip body member for movement relative thereto in one direction, with these elements being adapted to be molded as one piece with the lock down/spring member being interconnected by living hinge ribbons to the molding clip body member, the arrangement being such that the lock down/spring member can be folded 180° into the molding clip body member and retained therein by at least one locking nub on the lock down/spring member engaging a recessed groove in the molding clip body member and by a spring member.

It is another object of this invention to provide a molding attaching clip of the type referred to above which is adapted to be produced by conventional plastic molding methods and then to be assembled together, in effect, as a two-piece molding attaching clip with one element thereof being movable relative to the other so as to facilitate the assembly, for example, of a lower rocker molding to the lower rocker and door sill panel of an automobile.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
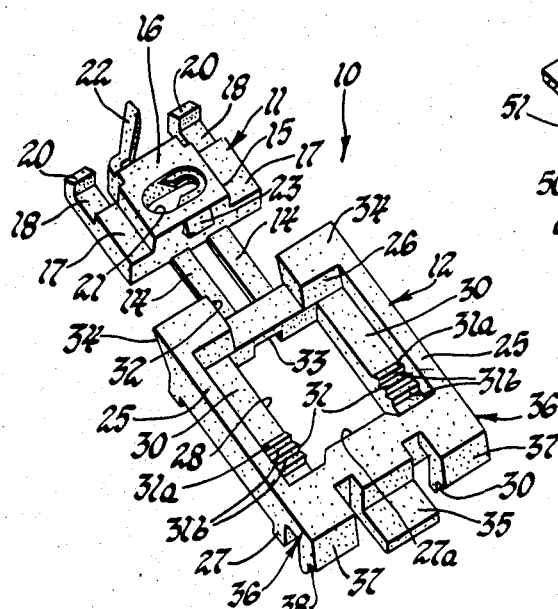
FIG. 1 is a perspective view of the subject molding attaching clip, per se, molded as a one-piece element.

Referring first to FIG. 1, the subject molding attaching clip, generally designated 10, made of a suitable plastic material is shown in its preferred as-molded configuration so that it can be handled as a single element. Thus as shown, the molding attaching clip 10 includes a lock down/spring member 11 and a molding clip body member 12, which in the construction shown, are interconnected by a pair of spaced apart thin, living hinge ribbons 14. These living hinge ribbons 14 permit an assembler to rotate the lock down/spring member 11 in a clockwise direction 180° with reference to FIG. 1, so that this lock down/spring member 11 can be positioned in and secured to the molding clip body member in unit assembly therewith, but movable relative to each other in a manner and for a purpose to be described in detail hereinafter.

The lock down/spring member 11, which is illustrated in an inverted position and not in its operative position, includes a T-shaped body portion, as viewed from an end thereof, that includes a central body portion 15 having a base surface 16 which is adapted to abut against a support surface, such as a rocker and door sill panel to be described, and having on opposite sides thereof recessed shoulder elements 17 each of which terminates at one end, the upper end with reference to FIG. 1, in resilient retaining pawl or tooth arms 18 with each such thus spaced apart tooth arms 18 having a pawl or tooth 20 thereon at its free end. As shown these teeth 20 depend downward when the lock down/spring member 11 is assembled to the molding clip body member 12, the assembled position shown in FIGS. 2, 3 and 4. In addition, the central body portion 15 is provided with a laterally extending central key slot 21 that includes, as well known in the art, an enlarged opening portion of a size to receive the head of a headed stud 55 and a narrow slot portion of a reduced size so as to receive the associate shank 55a of the headed stud.

The central body portion 15 at its end adjacent to the tooth arms 18 is provided with a flexible outward extending spring arm 22 and at its opposite end this central body portion 15 is provided with an outward extending, central, locking nub 23.

The molding clip body member 12, as best seen in FIG. 1, is of substantially rectangular configuration with spaced apart side walls 25 and opposed end walls 26 and 27 and it has a central opening 28 which is partly recessed, as defined by spaced apart recessed side shoulders 30 formed on the inboard sides of the side walls 25.

Figure 2:
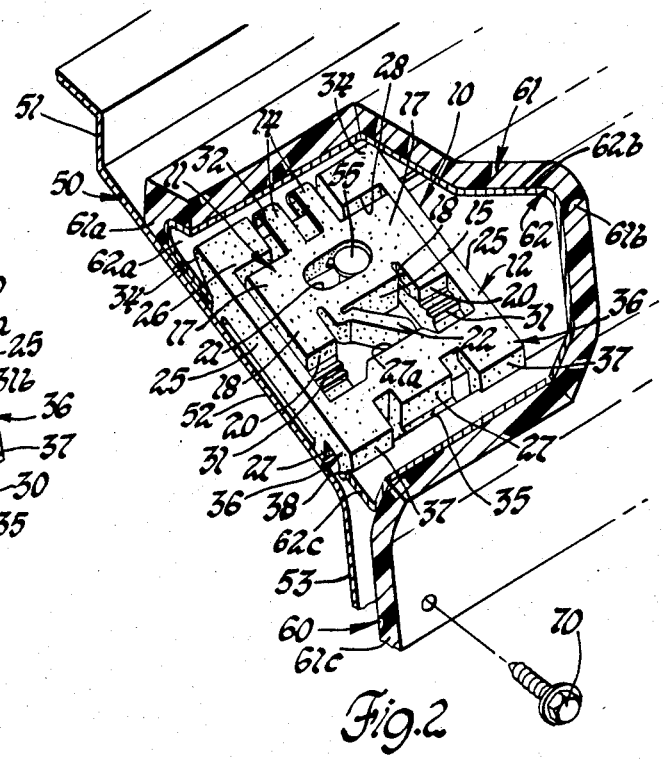
FIG. 2 is a perspective view of the subject molding attaching clip of FIG. 1 assembled together and mounted on a headed stud fixed to the outboard lower side surface rocker and door sill panel and having a lower rocker molding attached thereto.
Figure 3:
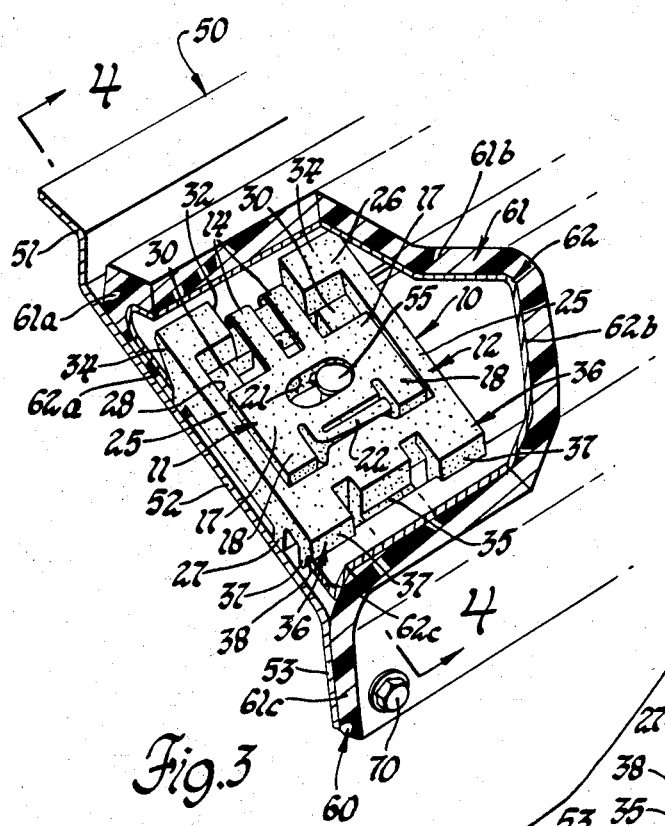
FIG. 3 is a view similar to FIG. 2 but showing the lower rocker molding moved up into a position wherein the lower portion of the rocker molding is secured to the underside surface of the rocker and door panel; and, FIG. 4 is cross-sectional view of the assembly of FIG. 3 taken along line 4—4 of FIG. 3.
Figure 4:
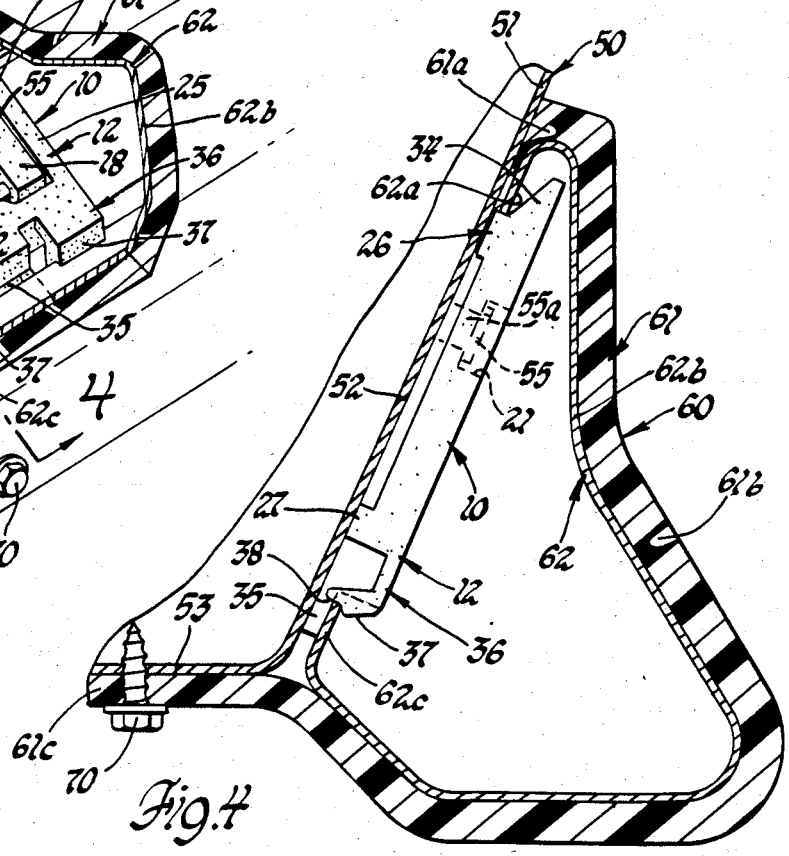

Each of these side shoulders 30 is provided with spaced apart ratchet teeth or detents 31 at one end thereof, and it is appropriately sized whereby it can receive the lock down/spring member 11 therein as shown in FIGS. 2 to 4. As shown, the detents 31 are located adjacent to the end of the molding clip body member 12 opposite the living ribbons 24 and each such detent includes an inclined ramp surface 31a and a flat abutment surface 31b for a purpose to be described, with the spacing between the abutment surfaces being of a predetermined extent, as desired, for a particular vehicle application.

Again as best seen in FIG. 1, the upper portion of the end wall 26 of the molding clip body member 12 provided with a central notch 32 to receive the living ribbons 14, as shown in FIGS. 2 and 3, while the lower portion of this end wall 26 on its inboard side is provided with a flat bottomed recess defining an abutment shoulder 33 for engagement by the locking nub 23 of the lock down/spring member 11. On opposite sides of the central notch 32 the end wall 26 is provided with spaced apart, outward extending, lateral stepped flange retainers 34, the side profile of such flange retainers being best shown in FIG. 4.

The end wall 27 of the molding clip body member 12 is partly bifurcated whereby it is provided with a lower flat flange 35 that extends outboard from the main body portion of the end wall 27 and, on opposite sides thereof the end wall 27 is provided with a pair of somewhat flexible fingers 36 that terminate at their free ends in depending flanges, with each such flange including an inclined cam ramp surface 37 that terminates at a notched portion 38. As shown, the flange 35 is of a suitable length so as to extend outboard of the ends of the fingers 36.

As shown in FIGS. 2, 3 and 4, the subject molding attaching clip 10 is especially useful to effect attachment of, for example, a lower rocker molding in an application wherein the support panel is in the form of a metal, lower rocker and door sill panel, generally designated 50, of a vehicle, with this lower rocker and door sill panel including at its door sill or upper end a stepped flanged door sill portion 51 which is integral with a rocker side panel 52 that, in turn, terminates at its lower end in an inward bent bottom rocker panel 53.

As conventional, a longitudinal extending row of spaced apart headed studs 55 are suitably fixed, as by having the shanks 55a thereof welded to the rocker side panel portion 52, at a predetermined location, only one such headed stud 55 being shown in FIGS. 2, 3 and 4.

The lower rocker molding 60 in the embodiment shown in FIGS. 2, 3 and 4, includes an outer molding member 61 made of a suitable material, such as an extruded suitable plastic material, and a suitably attached inner metal open channel member 62 that conforms in shape to the interior of the side portion of the outer molding member 61.

As shown, the open channel member 62 includes an upper return bent flange 62a, an intermediate portion 62b and a lower free end flange 62c, with reference to and as best seen in FIG. 4. The outer molding member 61 includes an upper return bent flange 61a which overlaps the return bent flange 62a of the open channel member 62, an intermediate portion 61b which encircles the main body portion of the open channel member 62 and a lower molding flange 61c that is adapted to be secured to the rocker bottom panel portion 53 of the rocker and door sill panel 50.

Referring now again to the molding attaching clip 10, an assembler, with reference to the as formed construction shown in FIG. 1, would first fold over the lock down/spring member 11 in a clockwise direction, 180° with reference to FIG. 1, into the molding clip body member 12 so that the locking nub 23 on the lock down/spring member 11 would be engaged by the abutment shoulder 33 of the molding clip body member 12 as biased by the spring arm 22 of the lock down/spring member 11 abutting against the inboard flat surface 27a of the end wall 27 of the molding clip body member 12 as shown in FIG. 2. Thus as shown in FIG. 2, the spring arm 22 is operative to bias the lock down/spring member 11 in a longitudinal direction or upward with reference to this Figure toward the inboard surface of the end wall 26 of the molding clip body member 12, a position at which the set of teeth 20 engage into the uppermost set of detents 31.

The thus assembled molding attaching clip 10 is then positioned so that the head of the headed stud 55 will first extend through the enlarged opening of the key slot 21 and then the molding attaching clip 10 is moved to the left, the position shown, for example in FIGS. 2 and 3, so that this molding attaching clip 10 is then firmly secured to the rocker side panel 52. As thus fixed to the rocker side panel 52, the molding clip body member 12 is sufficiently spaced from the flanged door sill portion 51 so as to enable an assembler to insert and then hook the return bent flanges 61a and 62a of the lower rocker molding 60 over the stepped flange retainer 34 after which the lower rocker molding 60 can then be pivoted so that the flange 62c can be forced down over the ramp surfaces 37 so as to be engaged in the notched portions 38 of the fingers 36 whereby it will thus be sandwiched between these notched portions 38 and the lower flat flange 35. As thus mounted, the lower rocker molding 60 would be positioned as shown in FIG. 2, a position at which its lower molding flange 61a is located below and in a predetermined spaced apart relation to the bottom rocker panel 53.

Thereafter, assuming the lower rocker molding 60 is thus secured to a plurality of similar molding attaching clips 10, the assembler would then push the lower rocker molding 60 upward until its flange 61a abuts against the bottom rocker panel 53 after which these elements are secured together by suitable fasteners, such as the washer hex head screw 70 as shown in FIGS. 3 and 4.

This upward movement of the lower rocker molding 60 into engagement with the bottom rocker panel 53 is possible since the upward force applied to the lower rocker molding 60 will overcome the bias force of the spring arm 22 whereby it can be moved to a portion similar to that best seen in FIG. 3 and, as this occurs the teeth 20 of the lock down/spring member 11 can move up over successive ramp surfaces 31a of the detents, as necessary until these teeth engage a pair of associate abutments surfaces 31b of the detents 31 corresponding, in effect, to the upward travel of the molding clip body member 12 relative to the fixed lock down/spring member 11. In this regard, it should now be apparent to those skilled in the art, that the number of detents 31 and their relative spacings are preselected for a given rocker molding attachment application so as to accommodate the expected tolerance variations for that particular application.

While the invention has been described with reference to the structures disclosed herein, it is not confined to the specific details set forth, since it is apparent that many modifications and changes can be made by those skilled in the art. For example, it is apparent that the lock down/spring member 11 and molding clip body member 12 could be molded as separate parts to thus eliminate the living hinge ribbons 14 while still being able to be assembled together as shown. This application is therefore intended to cover such modifications or changes as may come within the purposes of the improvements or scope of the following claims.

The embodiments of the invention in which an exclusive property or privilege is claimed are defined as follows:

1. A molding attaching clip includes a lock down/spring member secured in a molding clip body member that includes spaced apart first and second end walls and spaced apart stepped side walls, each of said stepped side walls defining a recessed inboard spaced apart side shoulder having spaced apart ratchet teeth adjacent to said second end walls and so as to define with said first and second walls a central opening, said first and second walls defining retaining means for opposite ends of an open channel molding member, said lock down/spring member including a central stepped body portion having a keyhole slot therein whereby said molding attaching clip can be secured to a headed stud fixed to a support panel; a spring arm at one end thereof and a pair of spaced apart resilient pawl arms on opposite sides of said spring arm that are adapted to operatively engage said ratchet teeth so as to permit movement of said molding clip body member in only one direction relative to said lock down/spring member in a direction against the bias of said spring arm, said lock down/spring member and said first end wall of said molding clip body member having lock means associated therewith to effect locking engagement of said lock down/spring member in said molding clip body member as biased into locking engagement by said spring arm engaging said second wall.

2. A molding attaching clip according to claim 1 wherein resilient living ribbons interconnect said lock down/spring member to said molding clip body, the arrangement being such that said resilient living ribbons permit said lock down/spring member to be operationally connected into said molding clip body.

3. A molding attaching clip includes a lock down/spring member secured in a molding clip body member that includes spaced apart first and second end walls and spaced apart stepped side walls, said stepped side walls defining recessed inboard spaced apart side shoulders each having spaced apart ratchet teeth adjacent to said second end wall, said spaced apart stepped side walls defining with said first and second walls a central opening, said first and second walls defining retaining means for opposite ends of an open channel molding member, said lock down/spring member including a central stepped body portion having a keyhole slot therein whereby said molding attaching clip can be secured to a headed stud fixed to a support panel; a pair of spaced apart resilient pawl arms at one end of said central stepped body adapted to operatively engage said ratchet teeth so as to permit movement of said molding clip body member in only one direction relative to said lock down/spring member, a spring arm operatively fixed to said one end of said central stepped body intermediate said resilient pawl arms and extending outboard thereof whereby said lock down/spring member in an as originally assembled position in said molding clip body has its said resilient pawl arms engaging the most inboard set of said ratchet teeth.

4. A molding attaching clip according to claim 3 further including resilient living ribbon means securing said lock down/spring member to said molding clip body whereby, as formed, they are in unit assembly.

* * * * *